(12) United States Patent
Hasegawa et al.

(10) Patent No.: US 10,116,570 B2
(45) Date of Patent: Oct. 30, 2018

(54) IN-VEHICLE NETWORK SYSTEM

(71) Applicant: DENSO CORPORATION, Kariya, Aichi-pref. (JP)

(72) Inventors: Takao Hasegawa, Kariya (JP); Syota Komori, Kariya (JP)

(73) Assignee: DENSO CORPORATION, Kariya (JP)

( * ) Notice: Subject to any disclaimer, the term of this patent is extended or adjusted under 35 U.S.C. 154(b) by 371 days.

(21) Appl. No.: 15/159,894

(22) Filed: May 20, 2016

(65) Prior Publication Data

US 2016/0352639 A1 Dec. 1, 2016

(30) Foreign Application Priority Data

May 29, 2015 (JP) ................. 2015-109829

(51) Int. Cl.
*H04L 12/801* (2013.01)
*H04L 12/26* (2006.01)
*H04L 29/08* (2006.01)

(52) U.S. Cl.
CPC .......... *H04L 47/13* (2013.01); *H04L 43/0876* (2013.01); *H04L 67/12* (2013.01)

(58) Field of Classification Search
CPC ...... H04L 47/13; H04L 43/0876; H04L 67/12
See application file for complete search history.

(56) References Cited

U.S. PATENT DOCUMENTS

| | | | |
|---|---|---|---|
| 9,871,669 B2* | 1/2018 | Logvinov | H04L 12/1886 |
| 2005/0165940 A1 | 7/2005 | Rode et al. | |
| 2010/0177787 A1* | 7/2010 | Boydstun | H04L 67/025 370/474 |
| 2014/0023090 A1 | 1/2014 | Hiramoto et al. | |
| 2014/0129900 A1 | 5/2014 | Hartwich | |

FOREIGN PATENT DOCUMENTS

| | | |
|---|---|---|
| JP | 08-186601 A | 7/1996 |
| JP | 10-229429 A | 8/1998 |
| JP | 2001-203767 A | 7/2001 |
| JP | 2001-352329 A | 12/2001 |
| JP | 2006-287738 A | 10/2006 |
| JP | 2013-038711 A | 2/2013 |
| JP | 2013-239886 A | 11/2013 |

* cited by examiner

*Primary Examiner* — Melvin Marcelo
(74) *Attorney, Agent, or Firm* — Posz Law Group, PLC

(57) ABSTRACT

An in-vehicle network system includes a receiver node and a sender node, among which the receiver node adds payload length information to a flow control frame, and sends the flow control frame to a sender node using a control protocol, and the sender node determines a payload length of a consecutive frame based on the payload length information for the sending of the consecutive frame after the reception of the flow control frame, thereby variably changing the payload length and reducing communication load of the network bus, without complicating a configuration and/or a control of the network system.

8 Claims, 13 Drawing Sheets

IN-VEHICLE NETWORK SYSTEM

CROSS REFERENCE TO RELATED APPLICATION

The present application is based on and claims the benefit of priority of Japanese Patent Application No. 2015-109829, filed on May 29, 2015, the disclosure of that is incorporated herein by reference.

TECHNICAL FIELD

The present disclosure generally relates to an in-vehicle network system in that plural nodes communicate with each other according to a control protocol via a network bus for the control of in-vehicle devices in a vehicle.

BACKGROUND INFORMATION

Apparatuses and devices installed in a vehicle are electrically controlled by an electronic control device/unit. In recent years, vehicles are highly electrified for high performance and high functionality, resulting in that increasing number of the in-vehicle devices are under control of the Electronic Control unit, or ECU. Therefore, a network bus through which the communications between network nodes are performed is suffering from an ever-increasing communication load among them when the network nodes perform communications according to a control protocol, for the control of the in-vehicle devices.

In addition to achieving high performance and high functionality, safety assurance of the vehicle is also a highly important issue for society. An international standard implemented for a functional safety of the vehicle requires that a vehicle having abnormality is required to transition to a safe state within a preset period of time. In view of such a standard, the network load of the in-vehicle network bus must be appropriately controlled. That is, the vehicle is not enabled to transition to the safe state within the preset period of time in case that the network bus in the vehicle is suffering from an overload communication and is not performing an efficient communication between the network nodes.

For the resolution of the overload communication of the network bus in the vehicle, the network system in a Japanese patent document, JP 2013-239886 A (patent document 1) proposes a changeable payload length of a frame that is exchanged (i.e., sent and received) via the network bus. By changing the payload length of the frame in the network bus, the overload communication of the network bus is lightened, lightening the process load on each of the network nodes, which improves an efficiency of the communications between the network nodes.

In the network system in the above-mentioned patent document 1, in order to determine the payload length of the frame that is exchanged among the network nodes, transmission and reception of the frame are performed according to a dedicated protocol.

That is, each of the network nodes exchanges the frame according to the dedicated protocol that is used exclusively for the determination of the payload length, prior to performing the communications according to the control protocol for the control of the in-vehicle devices.

After determining the payload length, each of the network nodes exchanges the frame with the determined payload length according to the control protocol.

Thus, it is necessary to implement the dedicated protocol that is not normally used for the control of the in-vehicle devices if you use the network system of the above-mentioned patent document 1 for the determination of payload length.

Therefore, in such a network system, the configuration and the control of the network system are complicated. Further, such a network system must interrupt the communications (i.e., the exchange of the frame performed by the control protocol), which leaves a room for improvement in terms of communication efficiency of the network.

SUMMARY

It is an object of the present disclosure to provide an in-vehicle network system that lightens a communication load of a network bus by changing a payload length while adopting a simpler configuration and control.

In one aspect of the present disclosure, an in-vehicle network system includes a network bus, a sender node connected to the network bus and sending a first frame, and a receiver node connected to the network bus and sending a flow control frame after receiving the first frame. The receiver node sends the flow control frame to the sender node after adding payload length information to the flow control frame according to a control protocol. The sender node determines a payload length of a consecutive frame to be transmitted after receiving the flow control frame, based on the payload length information.

In other aspects of the present disclosure, an in-vehicle network system includes in-vehicle devices in a vehicle, and a network bus communicably connecting plural nodes controlling the in-vehicle devices, the plural nodes communicating with each other using a control protocol. The plural nodes also include a sender node connected to the network bus and sending a first frame, and a receiver node connected to the network bus and sending a flow control frame after receiving the first frame. The receiver node sends the flow control frame to the sender node after adding payload length information to the flow control frame according to the control protocol, and the sender node determines a payload length of a consecutive frame to be transmitted after receiving the flow control frame, based on the payload length information.

According to the present disclosure, the sender node determines a payload length of the consecutive frame that is sent after receiving the flow control frame based on the payload length information. Therefore, by changing the payload length, the payload length of the consecutive frame is changed, thereby lightening the communication load of the network bus.

Further, the receiver node sends the flow control frame that has the payload length information added thereto to the sender node according to the control protocol. Therefore, the payload length is changeable according to the control protocol that is normally used in a vehicle for the control of the in-vehicle devices, thereby enabling the determination of the payload length without using a dedicated protocol for such a purpose.

Further, in other aspects of the present disclosure, an in-vehicle network system for controlling in-vehicle devices in a vehicle includes a network bus communicably connecting plural nodes communicating with each other using a control protocol, the plural nodes, a sender node connected to the network bus and sending a first frame, and a receiver node connected to the network bus and sending a flow control frame (FC) after receiving the first frame.

The sender node makes a payload length of a consecutive frame (CF) that is sent after the reception of the flow control frame shorter, as a response time of a node of the plural nodes connected to the network bus increases.

The payload length is changeable also in the above-described configuration according to the control protocol that is normally used in a vehicle for the control of the in-vehicle devices, depending on the communication load of each of the nodes in the network, thereby enabling each of the network nodes to perform an efficient communication therebetween.

Further, according to the present disclosure, the in-vehicle network system having a simple configuration and control is enabled to lighten the communication load of the network bus by changing the payload length.

BRIEF DESCRIPTION OF THE DRAWINGS

Objects, features, and advantages of the present disclosure will become more apparent from the following detailed description made with reference to the accompanying drawings, in that.

DETAILED DESCRIPTION

Hereafter, embodiments of present disclosure are described, referring to the accompanying drawings. In order to make it easy to understand the description, the same numerals are used consistently to represent the same/similar components in each of the drawings, and the description of the same component is not repeated.

Figure 1:
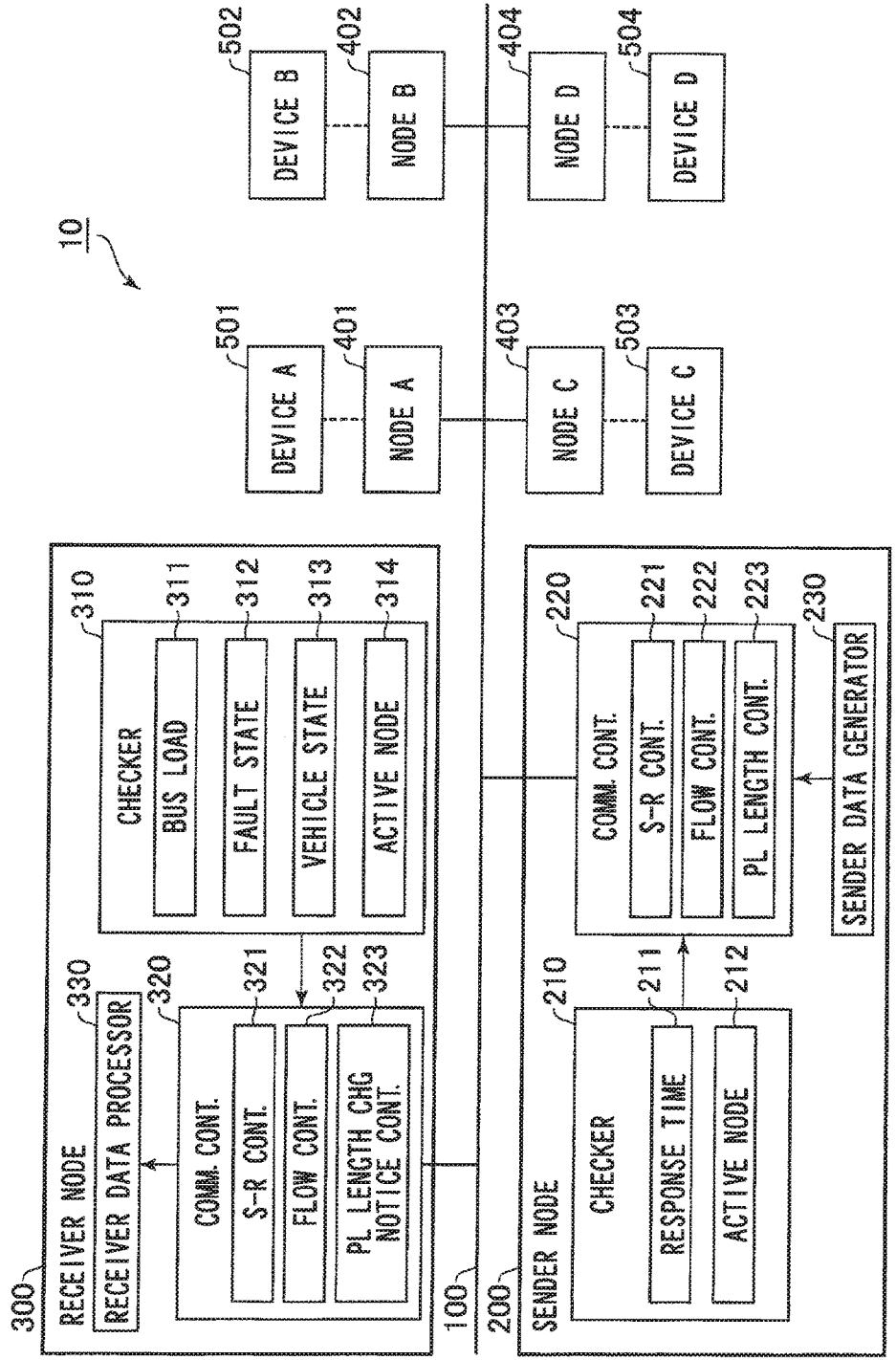
FIG. 1 is a block diagram of a functional configuration of an in-vehicle network system concerning a first embodiment of the present disclosure.

First, a configuration of an in-vehicle network system 10 concerning the first embodiment of the present disclosure is described, referring to FIG. 1. The in-vehicle network system 10 is a system for controlling devices A-D 501-504 respectively disposed in a vehicle (not illustrated). The in-vehicle network system 10 includes plural nodes connected to a network bus 100. Communication among the plural nodes is enabled by transmitting and receiving a predetermined frame mutually via the network bus 100.

FIG. 1 shows, as an illustration of the block diagram, a node A 401 that controls a device A 501 (for example, an engine), a node B 402 that controls the device B 502 (for example, a steering device), a node C 403 that controls a device C 503 (for example, an air-conditioner), and a node D 404 that controls a device D 504 (for example, a lighting device), among other nodes.

FIG. 1 also shows a sender node 200 and a receiver node 300, respectively illustrated as example details of the configuration of the nodes. That is, each of the nodes A-D 401-404 may be provided with the same configuration either as the sender node 200 or the receiver node 300 mentioned below.

Each of the plural nodes is entirely or partially provided as an analog circuit, or as a digital processor. Either way, in order to achieve the function that outputs a control signal based on a received signal, functional control blocks are installed in each of those nodes.

FIG. 1 illustrates the sender node 200 and the receiver node 300, respectively, as a diagram of functional control blocks. Note that the analog circuit or a software module in the digital processor, or the sender node 200 and the receiver node 300 need not necessarily be divided into plural control blocks as shown in FIG. 1. That is, one block in the circuit or in the module may correspond to plural functional control blocks in FIG. 1, or plural blocks in the circuit or the module may correspond to one functional control block in FIG. 1. In other words, the skilled in the art may arbitrarily change the configuration of the sender node 200, and the receiver node 300 for the processes mentioned below.

The sender node 200 has a checker 210, a communication controller 220, and a sender data generator 230 and is connected to the network bus 100.

The checker 210 is a block that monitors various elements related to communication of the in-vehicle network system 10. The checker 210 has a response time checker 211 and an active node checker 212.

The response time checker 211 monitors a "response time", which is a lapse time from a transmission of a frame by the sender node 200 to the other node to a reception of acknowledgement coming back from the other node.

The active node checker 212 monitors whether each of the nodes connected to the in vehicle network system 10 is in an "active state" performing a certain process, or in a "sleep state" not performing any process.

The checker 210 requests the communication controller 220 for change of a payload length, based on a monitor result of the response time checker 211 and the active node checker 212.

The communication controller 220 is a block that controls communication of the sender node 200 through the network bus 100. The communication controller 220 has a send-receive controller 221, a flow controller 222, and a payload (PL) length change controller 223.

The send-receive controller 221 sends and receives a frame to/from the other nodes via the network bus 100, according to the predetermined protocol. When the send-receive controller 221 controls a device for a normal travel of the vehicle, the controller 221 sends and receives (i.e., exchanges) the frame according to a control protocol that is pre-defined.

In transmission and reception of the frame of the sender node 200 to/from the other nodes, the flow controller 222 performs management of the transmission rate of the frames.

The PL length change controller 223 changes the payload length of the frame that is sent by the sender node 200, based on a request from the checker 210 that is mentioned above.

The sender data generator 230 is a block that generates predetermined data that is needed for the control the in-vehicle devices. The sender data generator 230 requests transmission of the generated data for the communication controller 220, and sends the frame that has the data concerned added thereto via the network bus 100 from the communication controller 220.

The receiver node 300 has a checker 310, a communication controller 320, and a receiver data processor 330 and is connected to the network bus 100.

The checker 310 is a block that monitors various elements related to communication of the in-vehicle network system 10. The checker 310 has a bus load checker 311, a fault state checker 312, a vehicle state checker 313, and an active node checker 314.

The bus load checker 311 monitors a communication load of the network bus 100.

The fault state checker 312 monitors an in-vehicle device that is controlled by the communication between the plural nodes via the network bus regarding whether the device is in a "normal state" (i.e., is normally operating), or in a "fault state" (i.e., is not normally operating).

The vehicle state checker 313 monitors a state of the vehicle in which the in-vehicle network system 10 is disposed. Specifically, the vehicle state checker 313 monitors a vehicle state in terms of picking up a process load changing factor that changes a process load in each of the network nodes (e.g., a cranking of the engine in the vehicle, an increase of the number of engine rotation and the like).

The active node checker 314 monitors whether each of the network nodes connected to the network bus 100 is in the "active state" or in the "sleep state".

The communication controller 320 is a block that controls communication of the receiver node 300 via the network bus 100.

The communication controller 320 has a send-receive controller 321, a flow controller 322, and a payload (PL) length change notice controller 323.

The send-receive controller 321 performs transmission and reception of the frame to/from the other nodes via the network bus 100 according to the predetermined protocol. When the send-receive controller 321 controls a device for a normal travel of the vehicle, the controller 321 sends and receives (i.e., exchanges) the frame according to a control protocol that is pre-defined.

The flow controller 322 performs management of the transmission rate of the frames between the receiver node 300 and the other nodes.

The PL length change notice controller 323 notifies change of the payload length to the sender node 200.

Figure 2:
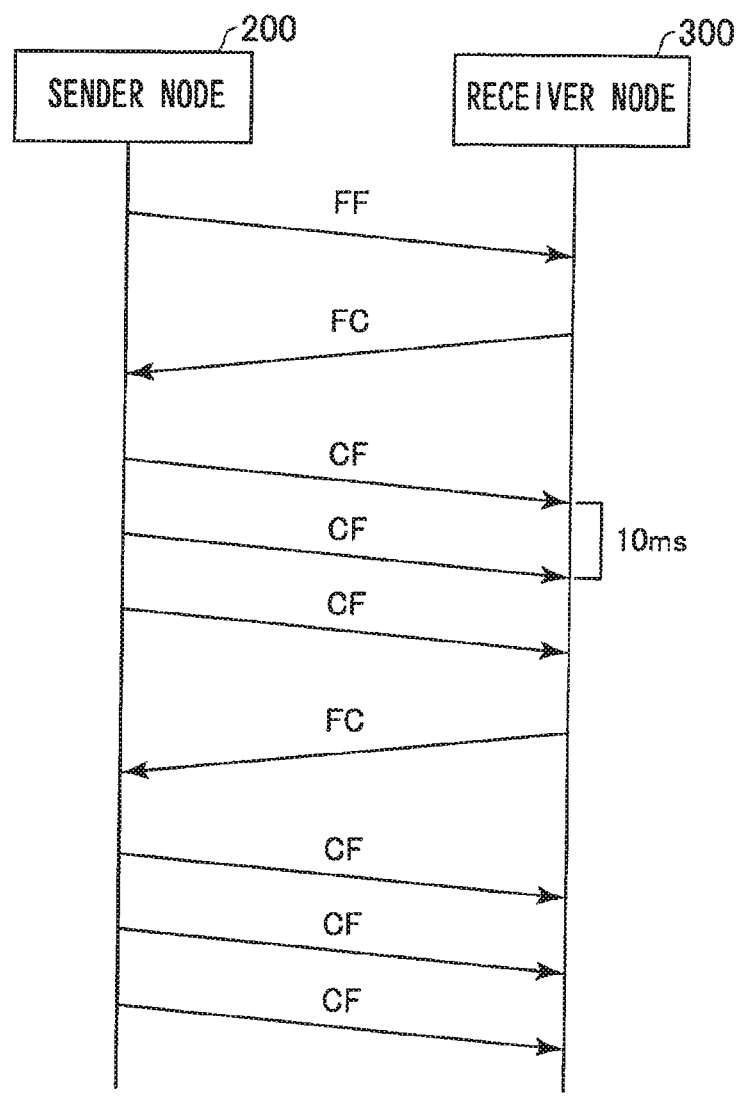
FIG. 2 is a diagram of transmission and reception of a frame between a sender node and a receiver node in FIG. 1.
Figure 3:
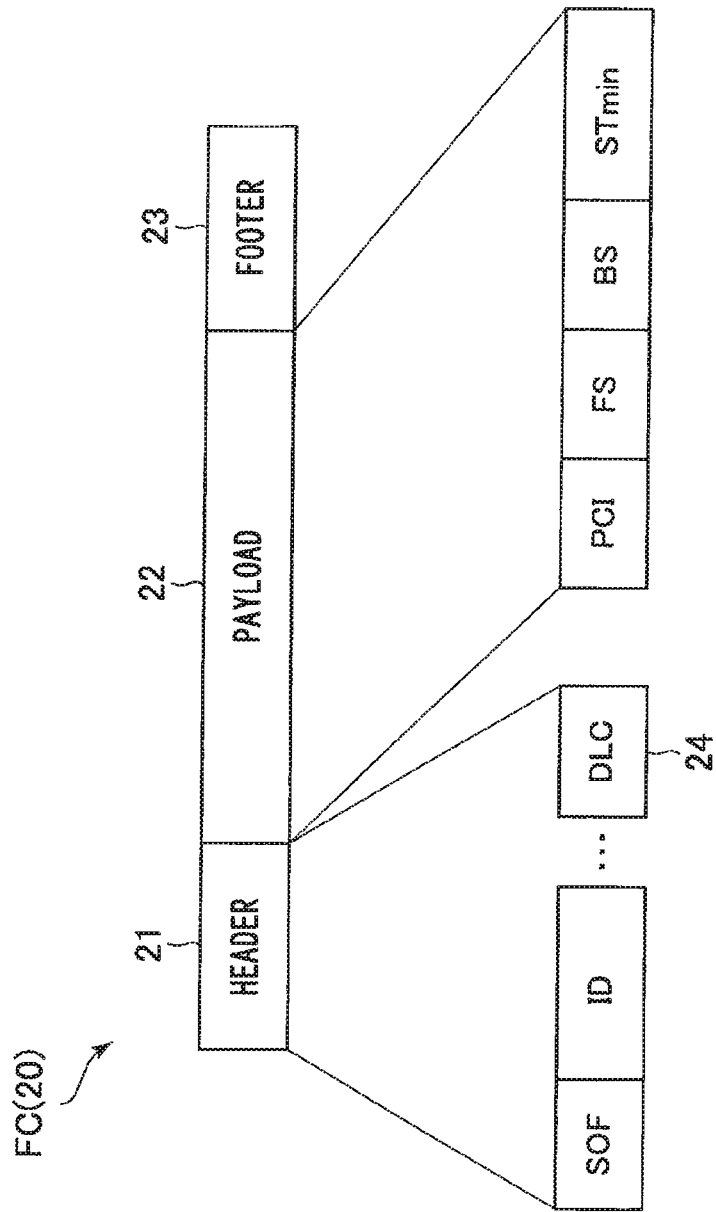
FIG. 3 is an illustration diagram of configuration of a flow control frame of FIG. 2.

The communication between the sender node 200 and the receiver node 300 is described, referring to FIGS. 2 and 3. In FIG. 2, time "passes" (i.e., progresses) from top to bottom, and the frame is exchanged between the sender node 200 and the receiver node 300 in a direction indicated by an arrow.

The sender node 200 and the receiver node 300 perform transmission and reception of the frame, according to the protocol defined as the International Standard (ISO15765-2) via the network bus 100 (refer to FIG. 1).

First, the sender node 200 sends a first frame FF to the receiver node 300 at a transmission start time of multiple frames. Specifically, the communication controller 220 of the sender node 200 mentioned above sends the first frame FF to the receiver node 300 via the network bus 100 at such timing.

The receiver node 300 that has received the first frame FF sends a flow control frame FC back to the sender node 200 as an acknowledgement. The flow control frame has, added thereto, information regarding (i) the number of a consecutive frames CF that is allowed to be transmitted from the sender node 200 by receiving one flow control frame FC, and (ii) a transmission interval between each of the consecutive frames CF.

The flow control frame FC (i.e., 20) includes a header 21, a payload 22, and a footer 23, as shown in FIG. 3.

The header 21 is made up from plural packets (e.g., Start Of Frame (SOF), Identifier (ID) and the like).

Similarly, the payload 22 following the header 21 is also made up from plural packets (e.g., Protocol Control Information (PCI)).

Further, at the end of the header 21, Data Length Code (DLC) 24 is added.

The DLC 24 is the information about the payload length of the payload 22 (i.e., the payload length information).

The receiver node 300 sends the consecutive frames CF based on information of the flow control frame FC, after receiving the flow control frame FC. FIG. 2 shows an example in which, by receiving one flow control frame FC, the number of consecutive frames CF allowed to be transmitted from the sender node 200 is set to 3, and the transmission interval of each of the consecutive frames CF is set to 10 msec.

In the in-vehicle network system 10 configured as mentioned above, in order to enable each of the plural nodes to perform communication efficiently via the network bus 100, the payload length of the transmitted/received frame is changed suitably.

More practically, when the communication load of the network bus 100 is overly high and/or the process load of each of the nodes is overly high, the in-vehicle network system 10 changes the payload length of the frame to a relatively low number, for lightening those loads.

Hereafter, change of the payload length is described in full details, referring to FIGS. 4 thru 7.

Figure 4:
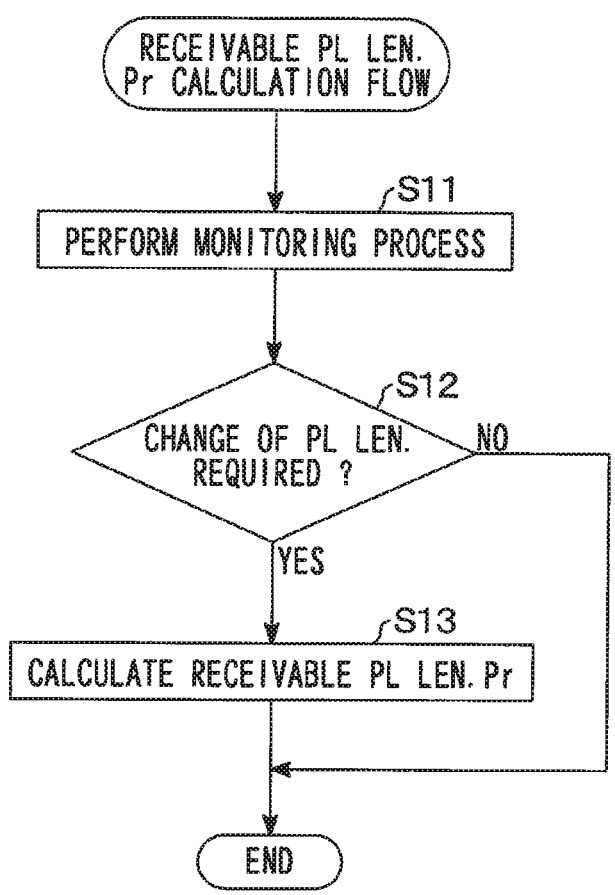
FIG. 4 is a flowchart of a monitoring process of a checker of the receiver node in FIG. 1.

FIG. 4 shows a receivable payload length Pr calculation flow that is performed by the checker 310 of the receiver node 300. A receivable payload length Pr indicates the maximum number of payload length at the moment, i.e., the largest number of the payload that is allowed to be received by the receiver node 300 in a state of the in-vehicle network system 10 at the time of such calculation.

The checker 310 of the receiver node 300 performs a monitoring process in Step S11 of FIG. 4. That is, the checker 310 monitors the communication load of the network bus 100 by using the bus load checker 311, monitors the state of the device by using the fault state checker 312, monitors the state of the vehicle by using the vehicle state checker 313, and monitors each of the nodes by using the active node checker 314.

Next, the checker 310 in Step S12 determines whether a payload length P of the frame that is received by the receiver node 300 is required to be changed. Here, the checker 310 determines the necessity of change of the payload length P based on the result of the monitoring process in Step S11. The concrete method of the determination performed here in Step S12 is mentioned later.

When it is determined that the payload length P is not required to be changed (S12:NO), the checker 310 ends the process. On the other hand, when it is determined that the payload length P is required to be changed (S12:YES), the checker 310 proceeds to the process of Step S13.

Next, the checker 310 in Step S12 calculates the receivable payload length Pr. More practically, the checker 310 calculates the receivable payload length Pr based on the result of the monitoring process in Step S11.

Figure 5:
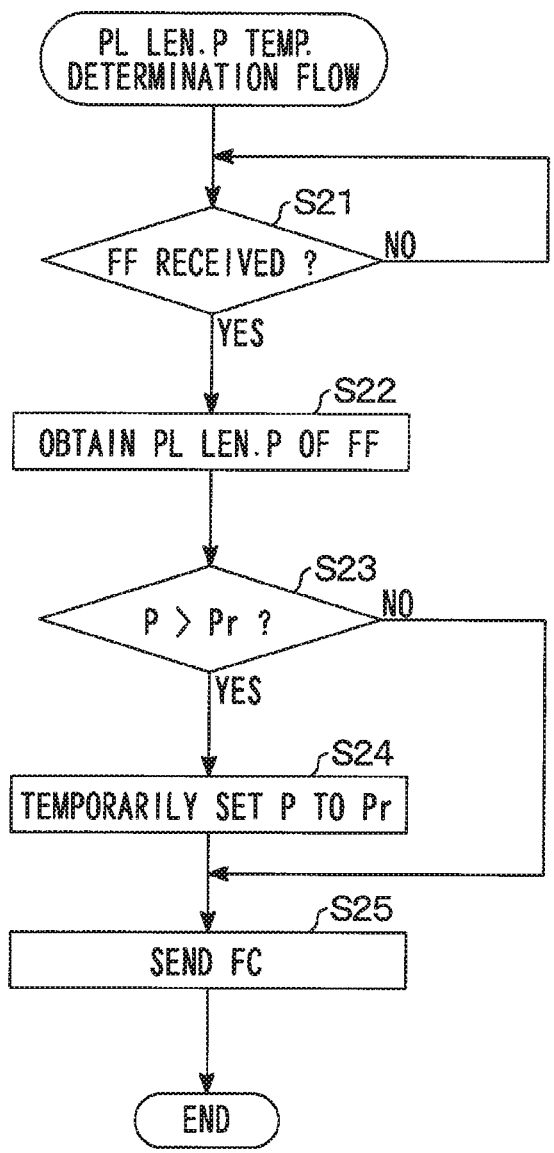
FIG. 5 is a flowchart of a process of a communication controller of the receiver node in FIG. 1.

FIG. 5 shows a payload length P temporary determination flow that is performed by the communication controller 320 of the receiver node 300. The communication controller 320 performs the payload length P temporary determination flow, after the checker 310 of the receiver node 300 performs the receivable payload length Pr calculation flow. The payload length P temporary determination flow is a process flow performed in order to determine the payload length P of the frame that the receiver node 300 receives as the optimum length. Since the payload length P may be changed by the communication controller 220 of the sender node 200 as mentioned later in detail, the determination in this flow is a "temporary determination".

The communication controller 320 of the receiver node 300 in Step S21 of FIG. 5 determines whether the receiver node 300 has received the first frame FF (refer to FIG. 2). When it is determined that the receiver node 300 has not received the first frame FF (S21:NO), the communication controller 320 stands by for reception of the first frame FF.

On the other hand, when it is determined that the receiver node 300 has received the first frame FF (S21:YES), the communication controller 320 proceeds to the process of Step S22.

Next, the communication controller 320 in Step S22 obtains the payload length P of the first frame FF. More practically, the communication controller 320 confirms a structure of the first frame FF that is received by the receiver node 300, and obtains the payload length P therefrom.

Next, the communication controller 320 in Step S23 determines whether the payload length P of the first frame FF is larger than the receivable payload length Pr. When it is determined that the payload length P of the first frame FF is larger than the receivable payload length Pr (S23:YES), that is, when the sender node 200 is transmitting a frame that has a larger-than-receivable payload length for the reception by the receiver node 300, the communication controller 320 proceeds to the process of Step S24.

Next, the communication controller 320 in Step S24 temporarily sets the payload length P to the receivable payload length Pr. That is, the communication controller 320 performs a temporary determination of the payload length P set to the receivable payload length Pr that is smaller than the payload length P of the first frame FF.

Next, the communication controller 320 in Step S25 sends the flow control frame FC (refer to FIG. 2) to the sender node 200. Now, the DLC 24 (refer to FIG. 3) of the header 21 of the flow control frame FC here specifies the receivable payload length Pr as the temporary determined payload length P mentioned above.

Specifically, the PL length change notice controller 323 of the communication controller 320 adds, to the DLC 24, the information (i.e., the payload length information) that shows that the payload length P is changed to the receivable payload length Pr.

On the other hand, in Step S23, when it is determined that the payload length P of the first frame FF is not larger than the receivable payload length Pr (S23:NO), the communication controller 320 proceeds to the process of Step S25, without performing the process of Step S24.

Next, the communication controller 320 in Step S25 sends the flow control frame FC to the sender node 200. Here, the DLC 24 (refer to FIG. 3) of the header 21 of the flow control frame FC has the information (i.e., the payload length information) that shows that the payload length P is the same as the one that has been transmitted last time.

Figure 6:
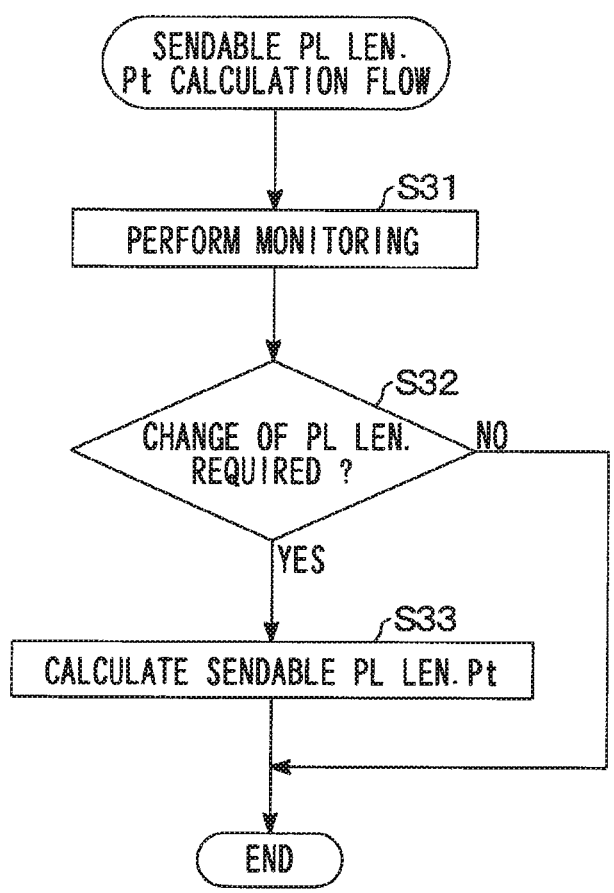
FIG. 6 is a flowchart of a monitoring process of the checker of the sender node in FIG. 1.

FIG. 6 shows a sendable payload length Pt calculation flow that is performed by the checker 210 of the sender node 200. The sendable payload length Pt indicates the maximum payload length at the moment (i.e., the largest number of the payload that is allowed to be sent by the sender node 200 in a state of the in-vehicle network system 10 at the time of such calculation).

The checker 210 of the sender node 200 in Step S31 of FIG. 6 performs the monitoring process. That is, the checker 210 monitors the response time by using the response time checker 211, and monitors the state of each of the nodes by using the active node checker 212.

Next, the checker 210 in Step S32 determines whether the payload length P of the frame that is sent by the sender node 200 is required to be changed. Here, the checker 210 determines the necessity of change of the payload length P based on the result of the monitoring process in Step S31. The concrete method of the determination performed here is mentioned later.

When it is determined that the payload length P is not required to be changed (S32:NO), the checker 210 ends the process. On the other hand, when it is determined that the payload length P is required to be changed (S32:YES), the checker 210 proceeds to the process of Step S33.

Next, the checker 210 in Step S33 calculates the sendable payload length Pt. Here, the checker 210 calculates the sendable payload length Pt based on the result of the monitoring process in Step S31 mentioned above.

Figure 7:
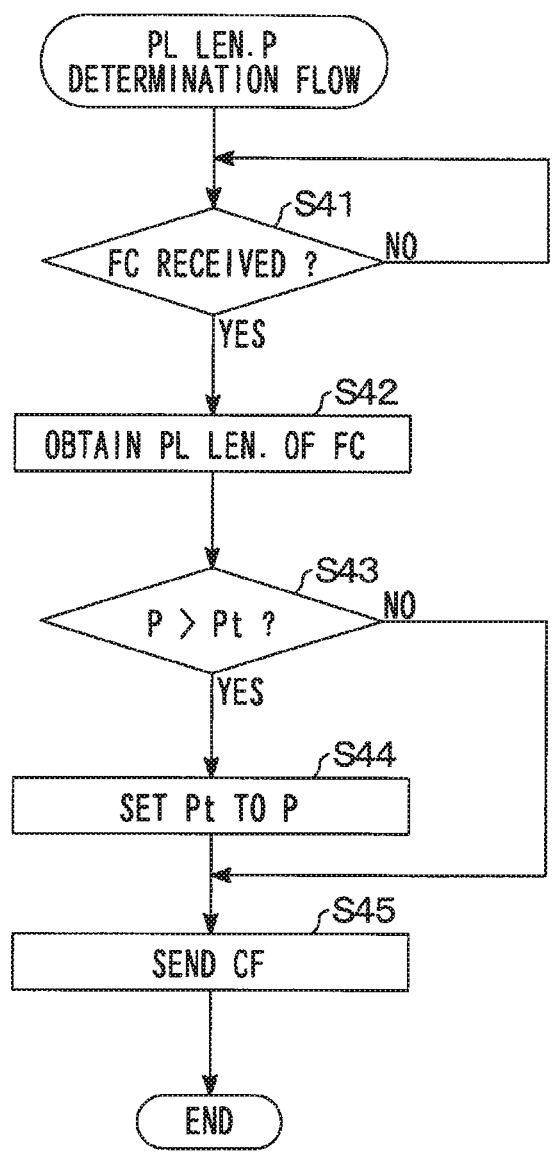
FIG. 7 is a flowchart of a process of the communication controller of the sender node in FIG. 1.

FIG. 7 shows a payload length P determination flow that is performed by the communication controller 220 of the sender node 200. The communication controller 220 performs the payload length P determination flow after the checker 210 of the sender node 200 mentioned above performs the sendable payload length Pt calculation flow.

The payload length P determination flow is a process flow performed in order to determine the payload length P of the frame that is sent by the sender node 200 as an optimum length, which is a final determination of the payload length P that has been temporarily determined by the payload length P temporary determination flow as mentioned above.

The communication controller 220 of the sender node 200 in Step S41 of FIG. 7 determines whether the sender node 200 received the flow control frame FC (refer to FIG. 2).

When it is determined that the sender node 200 has not received the flow control frame FC (S41:NO), the communication controller 220 stands by for reception of the flow control frame FC. On the other hand, when it is determined that the sender node 200 has received the flow control frame FC (S41:YES), the communication controller 220 proceeds to the process of Step S42.

Next, the communication controller 220 in Step S42 obtains the payload length P of the flow control frame FC. More practically, the communication controller 220 confirms the structure of the flow control frame FC that is received by the sender node 200, and obtains the payload length P therefrom.

Next, the communication controller 220 in Step S43 determines whether the payload length P of the flow control frame FC is larger than sendable payload length Pt.

When it is determined that the payload length P of the flow control frame FC is larger than the sendable payload length Pt (S43:YES), that is, when the sender node 200 is transmitting a frame that has a larger-than-receivable payload length for the reception by the receiver node 300, the communication controller 220 proceeds to the process of Step S44.

Next, the communication controller 220 in Step S44 determines the payload length P as sendable payload length Pt. That is, the communication controller 220 determines the payload length P as the sendable payload length Pt that is smaller than the payload length P of the flow control frame FC.

Next, the communication controller 220 in Step S45 sends the consecutive frame CF (refer to FIG. 2) to the receiver node 300. The payload length P of the consecutive frame CF here is the same as that of the sendable payload length Pt, as determined in S44.

On the other hand, in Step S43, when it is determined that the payload length P of the flow control frame FC is not larger than the sendable payload length Pt (S43:NO), the communication controller 220 proceeds to the process of Step S45, without performing the process of Step S44.

Next, the communication controller 220 in Step S45 sends the consecutive frame CF to the receiver node 300. The payload length P of the consecutive frame CF here is the same as that of the payload length P of the flow control frame FC obtained in S42.

Then, the determination of whether it is required to change the payload length in Step S12 of FIG. 4 or Step S32 of FIG. 6 is described, referring to FIGS. 8 thru 11.

Figure 8:
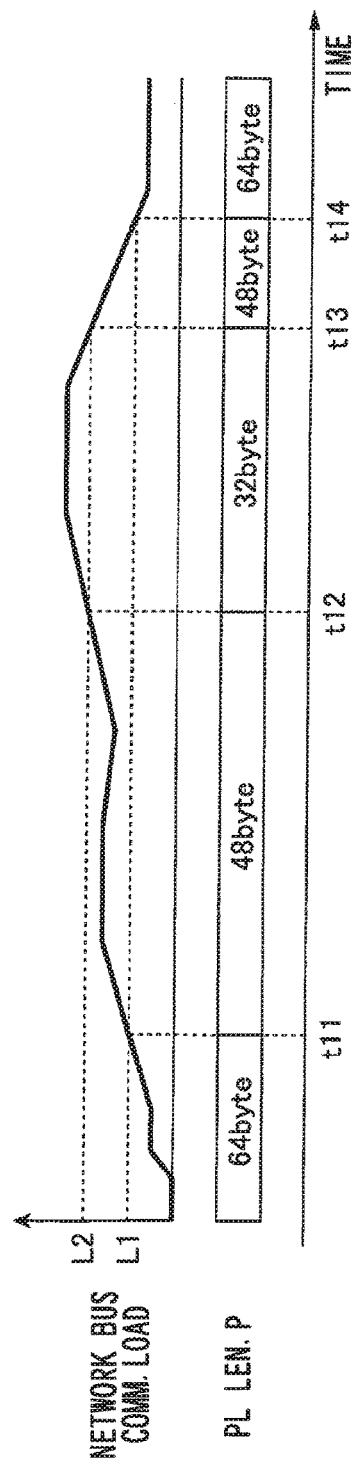
FIG. 8 is a time diagram of change of a payload length of a consecutive frame accompanying change of a communication load of a network bus.

FIG. 8 shows the communication load of the network bus 100 that is monitored by the bus load checker 311 of the receiver node 300 and change of the payload length P of the consecutive frame CF that is sent by the sender node 200.

As shown in FIG. 8, since the communication load of the network bus 100 is relatively low by time t11, the payload length P of the consecutive frame CF that is sent by the sender node 200 is set as relatively large 64 bytes by time t11.

When the communication load of the network bus 100 exceeds a threshold value L1 defined in advance at time t11, the checker 310 determines that the payload length P is required to be changed. That is, the checker 310 determines that, in view of the excess of the communication load of the network bus 100 exceeding the threshold value L1, the payload length P is required to be changed for the improvement of the efficiency of communication of each of the nodes. Based on such a determination, the receiver node 300 determines the DLC 24 (refer to FIG. 3) of the header 21 of the flow control frame FC that is sent to the sender node 200, for the setting of the payload length P as 48 bytes. Therefore, the payload length P of the consecutive frame CF that is sent by the sender node 200 decreases from 64 bytes to 48 bytes.

When the communication load of the network bus 100 increases further (i.e., exceeding a threshold value L2 that is defined in advance at time t12), the checker 310 determines that the payload length P is required to be changed.

Based on such a determination, the receiver node 300 determines the DLC 24 of the header 21 of the flow control frame FC that is sent by the sender node 200, for the setting of the payload length P as 32 bytes. Therefore, the payload length P of the consecutive frame CF that is sent by the sender node 200 decreases from 48 bytes to 32 bytes.

When the communication load of the network bus 100 decreases after time t12 (i.e., down to be less than the threshold value L2 at time t13), the checker 310 determines that the payload length P is required to be changed. That is, the receiver node 300 determines that, due to the decrease of the communication load of the network bus 100 to be less than threshold value L2, the payload length P is required to be changed, for the improvement of the efficiency of communication of each of the nodes. Based on such a determination, the receiver node 300 determines the DLC 24 of the header 21 of the flow control frame FC that is sent to the sender node 200, for the setting of the payload length P as 48 bytes. Therefore, the payload length P of the consecutive frame CF that is sent by the sender node 200 increases from 32 bytes to 48 bytes.

When the communication loads of the network bus 100 decrease further, to be less than the threshold value L1 at time t14, the checker 310 determines that the payload length P is required to be changed. Based on such a determination, the receiver node 300 determines the DLC 24 of the header 21 of the flow control frame FC that is sent to the sender node 200, for the setting of the payload length P as 64 bytes. Therefore, the payload length P of the consecutive frame CF that is sent by the sender node 200 increases from 48 bytes to 64 bytes.

As mentioned above, the receiver node 300 determines the DLC 24 (i.e., the payload length information) so that the payload length P of the consecutive frame CF that is sent by the sender node 200 is set to a smaller value as the communication load of the network bus 100 changes from low load to high load. In such manner, communication between each of the nodes is performed efficiently.

Figure 9:
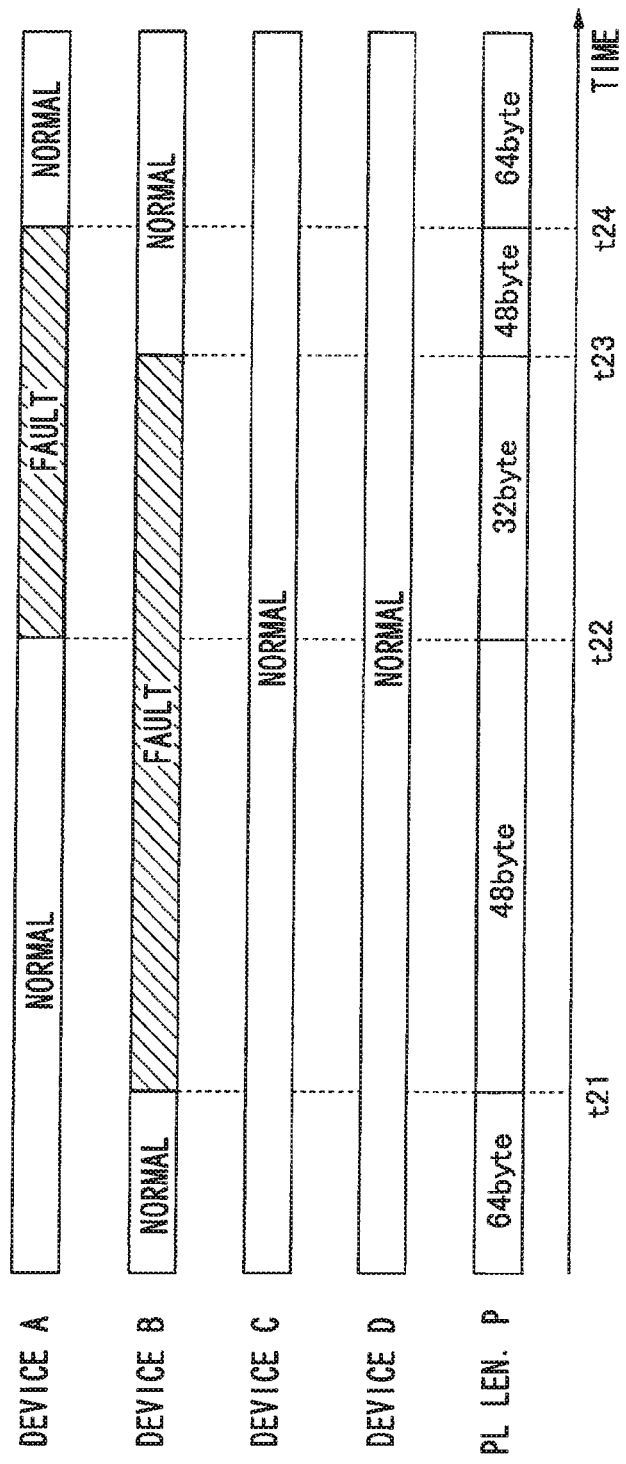
FIG. 9 is a time diagram of change of the payload length accompanying change of a state of network devices.

FIG. 9 shows a time diagram, which is about whether each of the devices A-D that are monitored by the fault state checker 312 of the receiver node 300 has a fault, together with change of the payload length P of the consecutive frame CF that is sent by the sender node 200.

As shown in FIG. 9, since all of the devices A-D are in a normal state by time t21, the process load of each of the nodes is relatively low by time t21. Therefore, the payload length P of the consecutive frame CF that is sent by the sender node 200 is set as the relatively large 64 bytes.

At time t21, when the device B turns into a fault state, the checker 310 determines that the payload length P is required to be changed. That is, in view of the fault state of one of the plural devices, it is determined that the process load of each of the nodes goes up, and it is determined that the payload length P is required to be changed, to decrease the process load in each of the nodes, and to improve the communication efficiency in each of the nodes.

Based on such a determination, the receiver node 300 determines the DLC 24 (refer to FIG. 3) of the header 21 of the flow control frame FC that is sent to the sender node 200, for the setting of the payload length P as 48 bytes. Therefore, the payload length P of the consecutive frame CF that is sent by the sender node 200 decreases from 64 bytes to 48 bytes.

At time t22, when the device A turns into a fault state, the checker 310 determines that the payload length P is required to be changed. That is, in view of the fault state of two devices, the checker 310 determines that the process load of each of the nodes has gone up further.

Based on such a determination, the receiver node 300 determines the DLC 24 of the header 21 of the flow control frame FC that is sent to the sender node 200, for the setting of the payload length P as 32 bytes. Therefore, the payload length P of the consecutive frame CF that is sent by the sender node 200 decreases from 48 bytes to 32 bytes.

At time t23, when the device B returns to the normal state, the checker 310 determines that the payload length P is required to be changed. That is, in view of the decrease of the fault state device to one device, it is determined that the process load of each of the nodes has fallen, and it is determined that the payload length P is required to be changed, to improve the efficiency of communication of each of the nodes.

Based on such a determination, the receiver node 300 determines the DLC 24 of the header 21 of the flow control frame FC that is sent to the sender node 200, for the setting of the payload length P as 48 bytes. Therefore, the payload length P of the consecutive frame CF that is sent by the sender node 200 increases from 32 bytes to 48 bytes.

At time t24, when the device A returns to the normal state, the checker 310 determines that the payload length P is required to be changed. That is, in view of a situation that all devices have returned to the normal state, the checker 310 determines that the process load of each of the nodes has fallen further.

Based on such a determination, the receiver node 300 determines the DLC 24 of the header 21 of the flow control frame FC that is sent to the sender node 200, for the setting of the payload length P as 64 bytes. Therefore, the payload length P of the consecutive frame CF that is sent by the sender node 200 increases from 48 bytes to 64 bytes.

As mentioned above, when a fault of the in-vehicle devices arises, the receiver node 300 determines the DLC 24 (i.e., the payload length information), so that the payload length P of the consecutive frame CF that is sent by the sender node 200 decreases in comparison to a no fault situation. In such manner, communication between each of the nodes is maintained as efficient according to the severity of fault of the in-vehicle devices.

Figure 10:
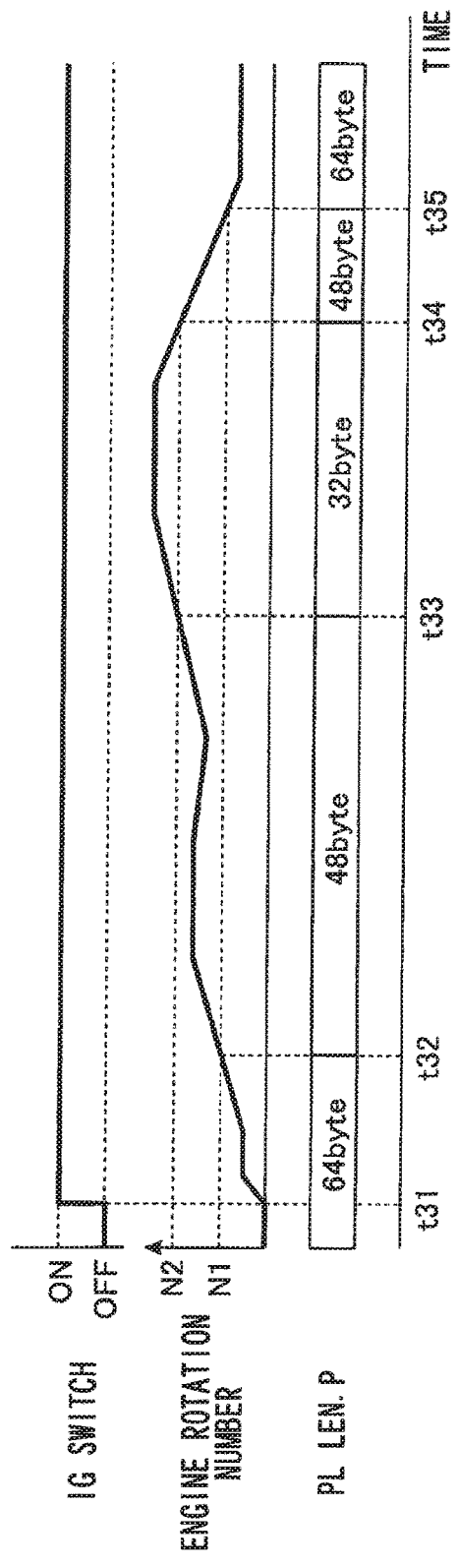
FIG. 10 is a time diagram of change of the payload length of the consecutive frame accompanying change of an the engine rotation number.

FIG. 10 shows a time diagram, which is about a vehicle state that is monitored by the vehicle state checker 313 of the receiver node 300 together with change of the payload length P of the consecutive frame CF that is sent by the sender node 200.

At time t31, when a user turns an ignition switch from an OFF state to an ON state, the engine rotation number of the vehicle starts to increase.

At time t31, since the communication load of the network bus 100 is relatively low, the payload length P of the consecutive frame CF that is sent by the sender node 200 is set as relatively large 64 bytes.

When the engine rotation number exceeds a threshold value N1 defined in advance at time t32, the checker 310 determines that the payload length P is required to be changed. That is, in view of the excess of the engine rotation number exceeding the threshold value N1, the checker 310 determines that the communication load of the network bus 100 has increased, and determines that the payload length P is required to be changed, to improve the efficiency of communication of each of the nodes.

Based on such a determination, the receiver node 300 determines the DLC 24 (refer to FIG. 3) of the header 21 of the flow control frame FC (20) that is sent to the sender node 200, for the setting of the payload length P as 48 bytes. Therefore, the payload length P of the consecutive frame CF that is sent by the sender node 200 decreases from 64 bytes to 48 bytes.

When the engine rotation number increases further, and when it exceeds a threshold value N2 defined in advance at time t33, the checker 310 determines that the payload length P is required to be changed. That is, in view of the excess of the engine rotation number exceeding the threshold value N2 that is greater than the threshold value N1, the checker 310 determines that the communication load of the network bus 100 has increased still larger.

Based on such a determination, the receiver node 300 determines the DLC 24 of the header 21 of the flow control frame FC that is sent to the sender node 200, for the setting of the payload length P as 32 bytes. Therefore, the payload length P of the consecutive frame CF that is sent by the sender node 200 decreases from 48 bytes to 32 bytes.

When the engine rotation number decreases after time t33, and it falls down to be less than the threshold value N2 at time t34, the checker 310 determines that the payload length P is required to be changed. That is, in view of the decrease of the engine rotation number to be less than the threshold value N2, the checker 310 determines that the communication load of the network bus 100 has decreased, and determines that the payload length P is required to be changed, to improve the efficiency of communication of each of the nodes.

Based on such a determination, the receiver node 300 determines the DLC 24 of the header 21 of the flow control frame FC that s sent to the sender node 200, for the setting of the payload length P as 48 bytes. Therefore, the payload length P of the consecutive frame CF that is sent by the sender node 200 increases from 32 bytes to 48 bytes.

When the engine rotation number decreases further and becomes less than the threshold value N1 at time t35, the checker 310 determines that the payload length P is required to be changed. That is, in view of the above, the checker 310 determines that the engine rotation number becomes less than the threshold value N1, and determines that the communication load of the network bus 100 has fallen to be smaller.

Based on such a determination, the receiver node 300 determines the DLC 24 of the header 21 of the flow control frame FC that is sent to the sender node 200, for the setting of the payload length P as 64 bytes. Therefore, the payload length P of the consecutive frame CF that is sent by the sender node 200 increases from 48 bytes to 64 bytes.

As mentioned above, while the receiver node 300 determines the communication load of the network bus 100 based on the vehicle state, when the communication load of the network bus 100 is high, the receiver node 300 determines the DCL 24 (i.e., the payload length information), for the smaller setting of the payload length P of the consecutive frame CF that is sent by the sender node 200, in comparison to a case where the communication load is low. In such manner, communication between each of the nodes is performed efficiently.

Figure 11:
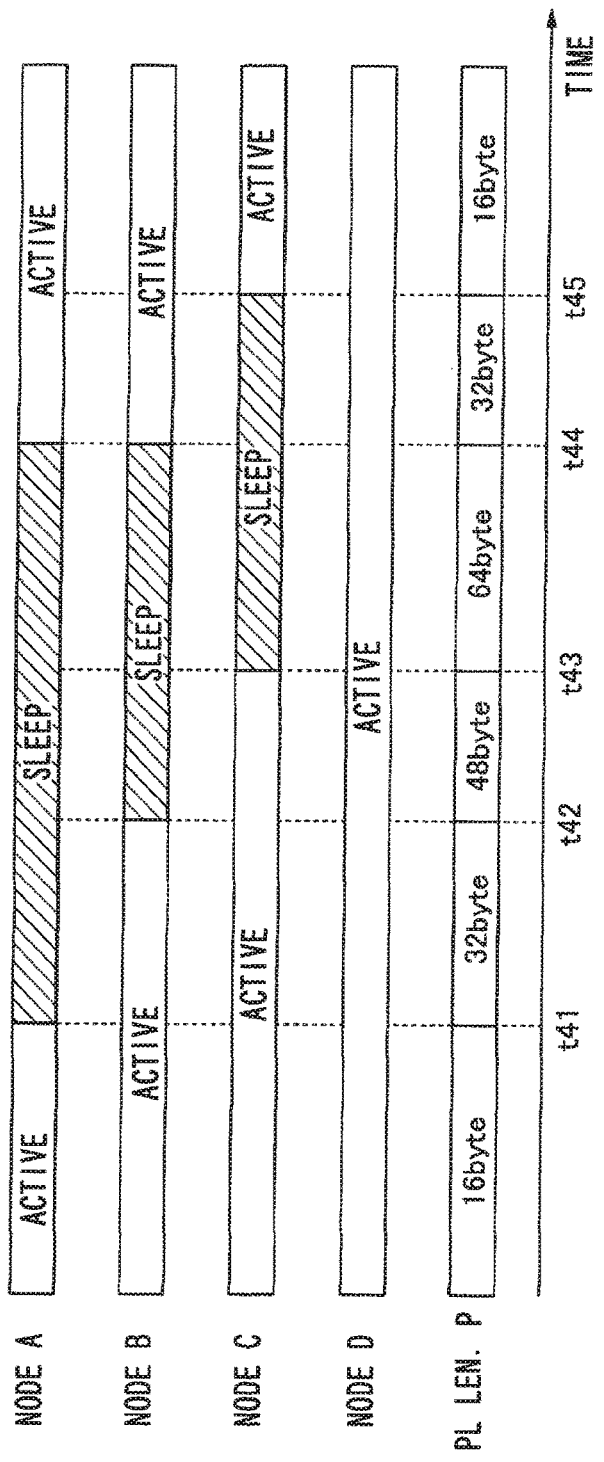
FIG. 11 is a time diagram of change of the payload length of the consecutive frame accompanying change of the state of the network nodes.

FIG. 11 shows a time diagram, which is about the state of each of the nodes that is monitored either by the active node checker 314 of the receiver node 300 or by the active node checker 212 of the sender node 200, together with change of the payload length P of the consecutive frame CF that is sent by the sender node 200.

As shown in FIG. 11, since all of the nodes A401, B402, C403, and D404 (refer to FIG. 1) are in the active state, the communication load of the network bus 100 is relatively high by time t41. Therefore, the payload length P of the consecutive frame CF that is sent by the sender node 200 is set as relatively low 16 bytes.

At time t41, when the node A401 is in the sleep state, the checker 310 and the checker 210 determine that the payload length P is required to be changed. That is, in view of a situation that one node is in the sleep state, the checker 310 and the checker 210 determine that the communication load of the network bus 100 has fallen, and determine that the payload length P is required to be changed, for the improvement of the efficiency of communication of each of the nodes.

Based on such a determination, the receiver node 300 determines the DLC 24 (refer to FIG. 3) of the header 21 of the flow control frame FC that is sent to the sender node 200, for the setting of the payload length P as 32 bytes. Therefore, the payload length P of the consecutive frame CF that is sent by the sender node 200 increases from 16 bytes to 32 bytes.

At time t42, when the node B402 also turns into the sleep state, the checker 310 and the checker 210 determine that the payload length P is required to be changed. That is, in view of a situation that two nodes are in the sleep state, the checker 310 and the checker 210 determine that the communication load of the network bus 100 has fallen further. Therefore, the payload length P of the consecutive frame CF that is sent by the sender node 200 increases from 32 bytes to 48 bytes.

At time t43, when the node C403 also turns into the sleep state, the checker 310 and the checker 210 determine that the payload length P is required to be changed. That is, in view of a situation that three nodes are in the sleep state, the checker 310 and the checker 210 determine that the communication load of the network bus 100 has fallen further.

Based on such a determination, the receiver node 300 determines the DLC 24 of the header 21 of the flow control frame FC that is sent to the sender node 200, for the setting of the payload length P as 64 bytes. Therefore, the payload length P of the consecutive frame CF that is sent by the sender node 200 increases from 48 bytes to 64 bytes.

At time t44, when the node A401 and the node B402 return to the normal state, the checker 310 and the checker 210 determine that the payload length P is required to be changed. That is, in view of a situation that two nodes have returned to the active state, the checker 310 and the checker 210 determine that the communication load of the network bus 100 has gone up, and determine that the payload length P is required to be changed, for the improvement of the efficiency of communication of each of the nodes.

Based on the receiver node 300 determines the DLC 24 of the header 21 of the flow control frame FC that is sent to the sender node 200, for the setting of the payload length P as 32 bytes. Therefore, the payload length P of the consecutive frame CF that is sent by the sender node 200 decreases from 64 bytes to 32 bytes.

At time t45, when the node C403 also returns to the active state, the checker 310 and the checker 210 determine that the payload length P is required to be changed. That is, in view of a situation that all the nodes are back in the active state, the checker 310 and the checker 210 determine that the communication load of the network bus 100 has gone up.

Based on such a determination, the receiver node 300 determines the DLC 24 of the header 21 of the flow control frame FC that is sent to the sender node 200, for the setting of the payload length P as 16 bytes. Therefore, the payload length P of the consecutive frame CF that is sent by the sender node 200 decreases from 32 bytes to 16 bytes.

When, as mentioned above, there are many nodes that are connected to the network bus 100 and are in the active state, the receiver node 300 determines the DLC 24, the payload length information, so that the payload length P of the consecutive frame CF that is sent by the sender node 200 decreases, in comparison to a situation in which there are only a few connected-and-active nodes. In such manner, the communication between each of the nodes is performed efficiently according to the load of the network bus 100.

Figure 12:
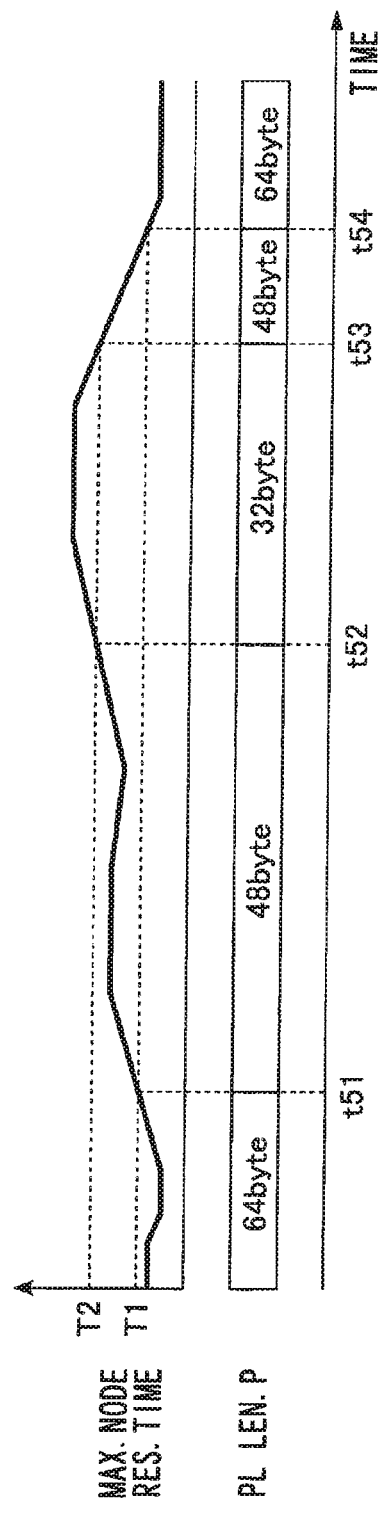
FIG. 12 is a time diagram of change of the payload length of the consecutive frame accompanying change of a maximum response time of the node concerning a second embodiment of the present disclosure.

The second embodiment of the present disclosure is described, referring to FIG. 12.

The second embodiment is provided with the same configuration as the first embodiment mentioned above, in which the sender node 200 by itself changes the payload length of the consecutive frame CF. Therefore, only the different point from the first embodiment mentioned above is described in the following.

FIG. 12 shows a time diagram, which is about the maximum response time among the node response times of the plural nodes that are monitored by the response time checker 211 of the sender node 200, together with change of the payload length P of the consecutive frame CF that is sent by the sender node 200.

As shown in FIG. 12, since the maximum node response time is relatively low, the payload length P of the consecutive frame CF that is sent by the sender node 200 is set as relatively large 64 bytes by time t51.

When the maximum node response time exceeds a threshold value T1 defined in advance at time t51, the checker 210 determines that the payload length P is required to be changed. That is, in view of a situation that the maximum node response time has exceeded the threshold value T1, the checker 210 determines that the process load of each of the nodes has gone up, and determines that the payload length P is required to be changed, for the improvement of the efficiency of communication of each of the nodes.

Based on such a determination, the sender node 200 determines the payload length P of the consecutive frame CF as 48 bytes.

When the maximum node response time increases further, and when it exceeds a threshold value T2 defined in advance at time t52, the checker 210 determines that the payload length P is required to be changed.

Based on such a determination, the sender node 200 determines the payload length P of the consecutive frame CF as 32 bytes.

When the maximum node response time decreases after time t53, i.e., falling down to be less than the threshold value T2 at time t53, the checker 210 determines that the payload length P is required to be changed. That is, in view of a situation that the maximum node response time has become less than the threshold value T2, the checker 210 determines that the payload length P is required to be changed, for the improvement of the efficiency of communication of each of the nodes.

Based on such a determination, the sender node 200 determines the payload length P of the consecutive frame CF as 48 bytes.

When the maximum node response time decreases further and becomes less than the threshold value T1 at time t54, the checker 210 determines that the payload length P is required to be changed.

Based on such a determination, the sender node 200 determines the payload length P of the consecutive frame CF as 64 bytes.

As mentioned above, the sender node 200 decreases the payload length P of the consecutive frame CF that is sent when the response time of the node connected to the network bus 100 is long, in comparison to a case that the response time is short. In such manner, communication between each of the nodes is performed efficiently according to the process load of each of the nodes.

Figure 13:
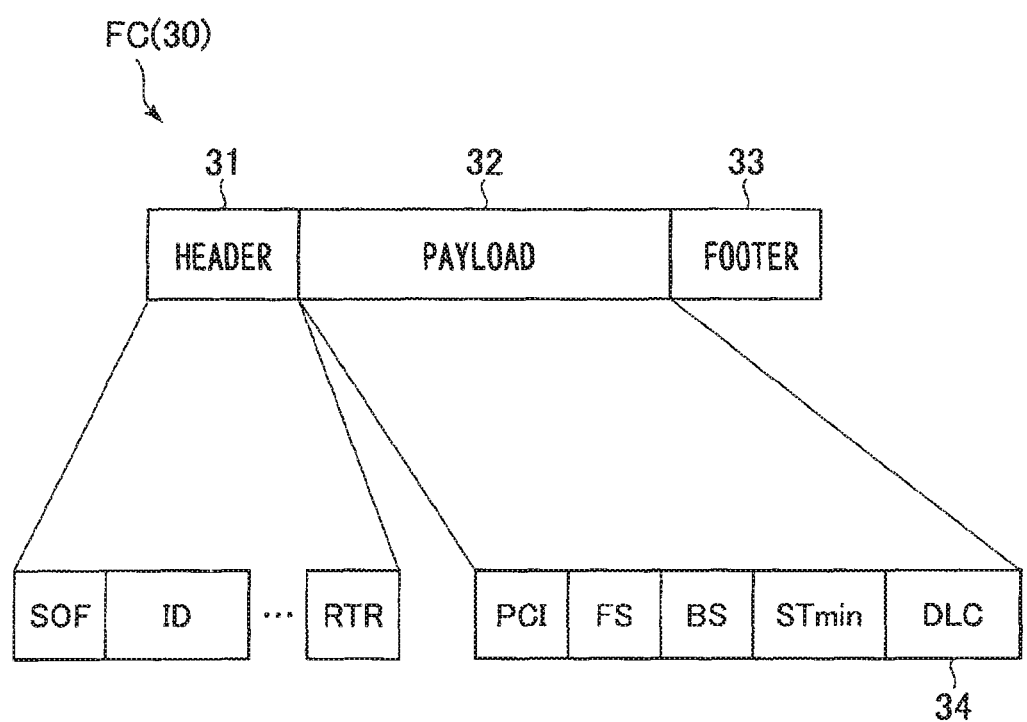
FIG. 13 is an illustration diagram of configuration of the flow control frame concerning a modification of the embodiment of the present disclosure.

Now, referring to FIG. 13, a flow control frame concerning a modification of the embodiments of the present disclosure is described. The flow control frame FC concerning the present modification (30) is configured according to the International Standard (ISO15765-2), and has a header 31, a payload 32, and a footer 33.

Unlike the flow control frame FC (20) concerning the above-described embodiment, the flow control frame FC concerning the present modification (30) has a Data Length Code (DLC) 34 added to the end of the payload 32.

The DLC 34 is the information (i.e., the payload length information) about the payload length of the payload 32. Based on such configuration, the same effect as the flow control frame FC (20) of the above-described embodiment is achieved.

Although the present disclosure has been described in connection with preferred embodiment thereof with reference to the accompanying drawings, it is to be noted that various changes and modifications will become apparent to those skilled in the art.

For example, in the embodiment mentioned above, the checker 210 of the sender node 200 includes each of the functional control blocks (i.e., the response time checker 211 and the active node checker 212, and the checker 310 of the receiver node 300) includes each of the functional control blocks (i.e., the bus load checker 311, the fault state checker 312, the vehicle state checker 313, and the active node checker 314). However, the present disclosure is not limited to such configuration.

That is, depending on the network topology, the person skilled in the art may arbitrarily and suitably determine which one of the checker 210 of the sender node 200 or the checker 310 of the receiver node 300 should include those functional control blocks.

Such changes, modifications, and summarized schemes are to be understood as being within the scope of the present disclosure as defined by appended claims.

What is claimed is:

1. An in-vehicle network system, the system comprising:
   in-vehicle devices in a vehicle; and
   a network bus communicably connecting plural nodes controlling the in-vehicle devices, the plural nodes communicating with each other using a control protocol, and comprising
      a sender node connected to the network bus and sending a first frame, and a receiver node connected to the network bus and sending a flow control frame after receiving the first frame, wherein
   the receiver node sends the flow control frame to the sender node after adding payload length information to the flow control frame according to the control protocol, and
   the sender node determines a payload length of a consecutive frame to be transmitted after receiving the flow control frame, based on the payload length information.

2. The in-vehicle network system of claim 1, wherein
   the flow control frame further comprises a header,
   the receiver node is capable of changing a data length code in the header of the flow control frame, and
   the sender node determines the payload length of the consecutive frame based on the data length code.

3. The in-vehicle network system of claim 1, wherein
   the receiver node adds the payload length information to a payload of the flow control frame.

4. The in-vehicle network system of claim 2, wherein
   the receiver node makes the payload length information to determine a shorter payload length of the consecutive frame, as communication load of the network bus increases.

5. The in-vehicle network system of claim 2, wherein
   the receiver node makes the payload length information to determine a shorter payload length of the consecutive frame, when a fault of one of the in-vehicle devices occurs.

6. The in-vehicle network system of claim 2, wherein
   the receiver node makes the payload length information to determine a shorter payload length of the consecutive frame, as a number of active state nodes connected to the network bus increases.

7. An in-vehicle network system for controlling in-vehicle devices in a vehicle, the system comprising:
   a network bus communicably connecting plural nodes communicating with each other using a control protocol, the plural nodes comprising;
   a sender node connected to the network bus and sending a first frame; and
   a receiver node connected to the network bus and sending a flow control frame after receiving the first frame, wherein
   the sender node makes a payload length of a consecutive frame that is sent after the reception of the flow control frame shorter, as a response time of a node of the plural nodes connected to the network bus increases.

8. An in-vehicle network system, comprising:
   a network bus;
   a sender node connected to the network bus and sending a first frame; and a receiver node connected to the network bus and sending a flow control frame after receiving the first frame, wherein
   the receiver node sends the flow control frame to the sender node after adding payload length information to the flow control frame according to a control protocol, and
   the sender node determines a payload length of a consecutive frame to be transmitted after receiving the flow control frame, based on the payload length information.

* * * * *